(12) United States Patent
Nagasaki

(10) Patent No.: US 8,539,239 B2
(45) Date of Patent: Sep. 17, 2013

(54) INFORMATION PROCESSING APPARATUS

(75) Inventor: Takeshi Nagasaki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 147 days.

(21) Appl. No.: 13/185,923

(22) Filed: Jul. 19, 2011

(65) Prior Publication Data

US 2012/0023327 A1 Jan. 26, 2012

(30) Foreign Application Priority Data

Jul. 22, 2010 (JP) ................................. 2010-164825

(51) Int. Cl.
*H04L 29/06* (2006.01)
(52) U.S. Cl.
USPC .............................. 713/175; 726/6
(58) Field of Classification Search
USPC .................... 726/5, 6, 10; 713/155, 156, 175
See application file for complete search history.

(56) References Cited

U.S. PATENT DOCUMENTS

2005/0076205 A1\* 4/2005 Thornton et al. ............. 713/156
2008/0104401 A1 5/2008 Miyamoto et al.

FOREIGN PATENT DOCUMENTS

WO WO 2008/050792 A1 5/2008

\* cited by examiner

*Primary Examiner* — Edward Zee
(74) *Attorney, Agent, or Firm* — Scully, Scott, Murphy & Presser, P.C.

(57) ABSTRACT

An information processing apparatus includes: an acquiring unit that acquires specific information; a preparation unit that makes out a certificate signing request based on the specific information, wherein the preparation unit makes out a first type certificate signing request including extensions and makes out a second type certificate signing request not including extensions; a display control unit that displays a selection screen on a display unit; and an output unit that is configured to output one of the first type certificate signing request and the second type certificate signing request to an outside according to selecting by a user in the selection screen.

12 Claims, 10 Drawing Sheets

INFORMATION PROCESSING APPARATUS

CROSS-REFERENCE TO RELATED APPLICATIONS

This application claims priority from Japanese Patent Application No. 2010-164825 filed on Jul. 22, 2010, the entire subject matter of which is incorporated herein by reference.

TECHNICAL FIELD

The invention relates to an information processing apparatus that prepares a certificate signing request.

BACKGROUND

There has been disclosed a technology relating to an electronic certificate of an x509 format that is used in communication such as SSL (Secure Socket Layer), TLS (Transport Layer Security) and the like. In particular, Patent Document 1 discloses a client apparatus that makes out a certificate signing request (CSR) including an extended area (hereinafter referred to as "extensions") in accordance with version 3 of the x509 format. A certificate authority makes out the electronic certificate including the extensions based on the certificate signing request prepared by the client apparatus.

SUMMARY OF THE INVENTION

Illustrative aspects of exemplary embodiments of the present invention provide a technology which enables a user to easily acquire one of a certificate signing request including extensions and a certificate signing request not including extensions.

DETAILED DESCRIPTION

<General Overview>

Figure 1:
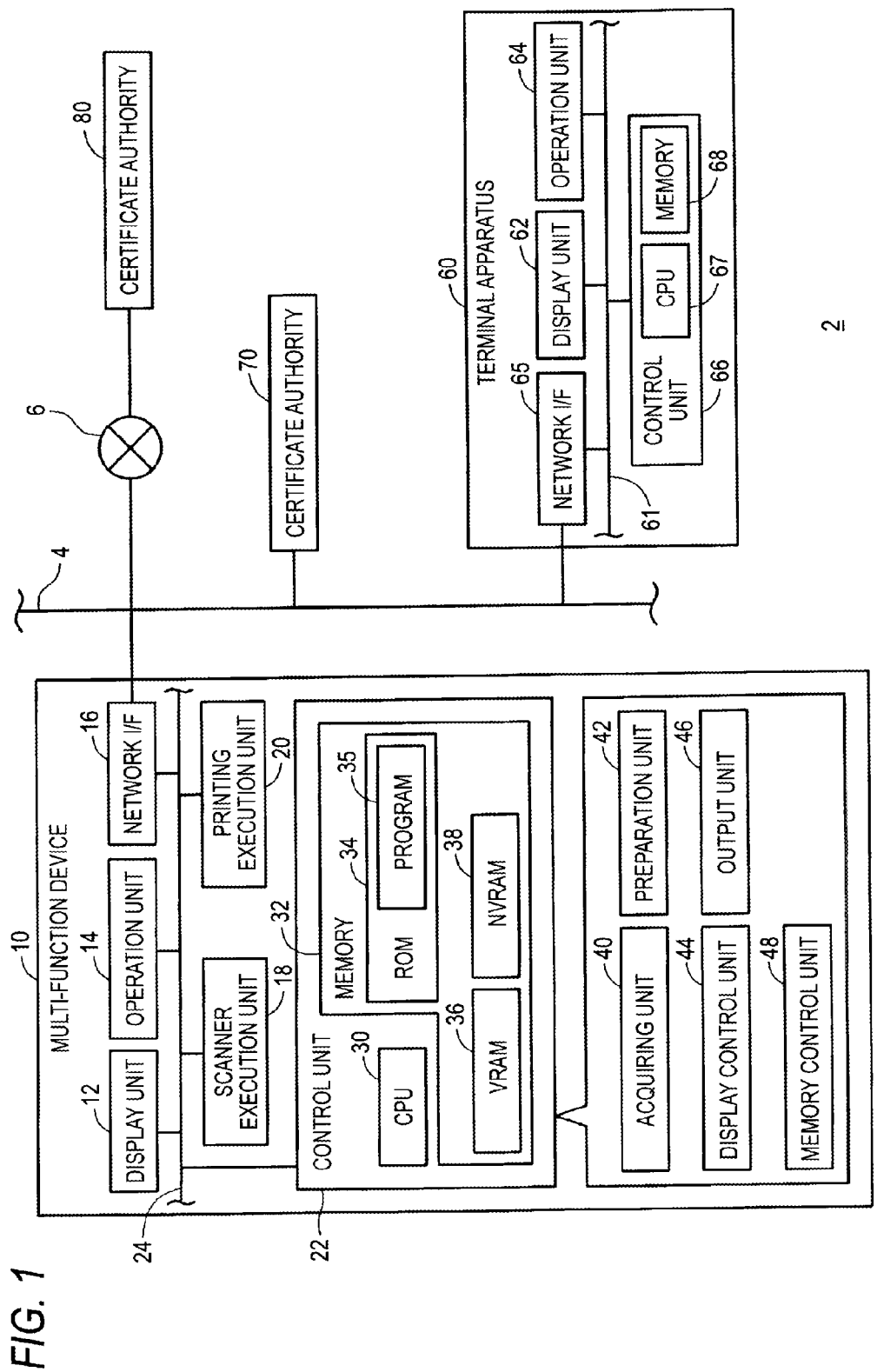
FIG. 1 shows an example of an information processing system according to a first exemplary embodiment of the invention.

However, there is a certificate authority that cannot make out an electronic certificate based on a certificate singing request including extensions. Accordingly, when a user wants the corresponding certificate authority to make out an electronic certificate, the user is required to enable a client apparatus to prepare a certificate signing request not including extensions.

Therefore, illustrative aspects of exemplary embodiments of the present invention provide a technology which enables a user to easily acquire one of a certificate signing request including extensions and a certificate signing request not including extensions.

According to one illustrative aspect of the invention, there is provided an information processing apparatus comprising: an acquiring unit that is configured to acquire specific information; a preparation unit that is configured to make out a certificate signing request based on the specific information, wherein the preparation unit is configured to make out a first type certificate signing request including extensions and to make out a second type certificate signing request not including extensions; a display control unit that is configured to display a selection screen on a display unit; and an output unit that is configured to output one of the first type certificate signing request and the second type certificate request to an outside accoding to selecting by a user in the selection screen.

According thereto, the information processing apparatus outputs one of the first and second type certificate signing requests according to a user's selection on the selection screen. Therefore, the user can select one of the first and second type certificate signing requests according to the selection screen, thereby easily acquiring one of the first and second type certificate signing requests.

According to another illustrative aspect of the invention, in the information processing apparatus, the selection screen is a screen that allows the user to select one of a first type certificate authority and a second type certificate authority that is different from the first type certificate authority, wherein when the user selects the first type certificate authority in the selection screen, the output unit outputs the first type certificate signing request, and wherein when the user selects the second type certificate authority in the selection screen, the output unit outputs the second type certificate signing request.

According thereto, by selecting one of the first and second type certificate authorities, the user can select the first or second type certificate signing request. In other words, the user can select one of the first and second type certificate signing requests based on the certificate authority that should make out a certificate. Thus, the user can easily image the options. Even if the user does not have sufficient knowledge about a difference between the first and second type certificate signing requests, the user can appropriately select one of the first and second type certificate signing requests.

According to still another illustrative aspect of the invention, in the information processing apparatus, the preparation unit makes out both the first type certificate signing request and the second type certificate signing request based on the specific information, and wherein the display control unit displays the selection screen on the display unit after the preparation unit makes out both the first type certificate signing request and the second type certificate signing request.

According thereto, after making out the first and second type certificate signing requests, the information processing apparatus can output the first or second type certificate signing request that is selected by the user. Therefore, compared to a configuration in which a user selects one of the first and second type certificate signing requests and then the one certificate signing request is made out and output, it is possible to shorten a time period from the user selection to the output of the certificate signing request.

According to still another illustrative aspect of the invention, in the information processing apparatus, the preparation unit makes out both the first type certificate signing request and the second type certificate signing request in a memory, and wherein the preparation unit is configured to: delete the second type certificate signing request from the memory when the user selects for the first type certificate singing request in the selection screen; and delete the first type certificate signing request from the memory when the user selects for the second type certificate singing request in the selection screen.

According thereto, the information processing apparatus can quickly delete the non-selected first or second certificate signing request of the prepared first and second certificate signing requests from the memory.

According to still another illustrative aspect of the invention, in the information processing apparatus, the preparation unit makes out both the first type certificate signing request and the second type certificate signing request in a memory, and wherein the preparation unit is configured to delete the first type and second type certificate signing requests from the memory when a first certificate, which is made out based on the first type certificate signing request, or a second certificate, which is made out based on the second type certificate signing request, is installed into the information processing apparatus.

According thereto, the information processing apparatus does not delete the first and second type certificate signing requests until the first or second certificate is installed in the information processing apparatus. Therefore, when a certificate authority does not make out a certificate based on the one certificate signing request that is selected according to the selection screen and the user wants the certificate authority to make out a certificate based on the other certificate signing request, for example, the user can acquire the other certificate signing request from the information processing apparatus without enabling the information processing apparatus to re-prepare the other certificate signing request.

According to Still another illustrative aspect of the invention, in the information processing apparatus, the preparation unit is configured to: make out the first type certificate signing request without making out the second type certificate signing request when the user selects for the first type certificate signing request in the selection screen; and make out the second type certificate signing request without making out the first type certificate signing request when the user selects for the second type certificate signing request in the selection screen.

According thereto, the information processing apparatus makes out only one certificate signing request that is selected by the user. The information processing apparatus does not have to prepare a certificate signing request that is not selected by the user. Thus, it is possible to reduce the resource burden of the information processing apparatus (for example, burden of the preparing process and burden of the memory).

According to still another illustrative aspect of the invention, in the information processing apparatus, the preparation unit is further configured to: when the user selects for the first type certificate signing request, make out a first secret key and a first public key and make out the first type certificate signing request including the first public key; and when the user selects for the second type certificate singing request, make out a second secret key and a second public key and make out the second type certificate signing request including the second public key.

According to still another illustrative aspect of the invention, the information processing apparatus further comprises a memory control unit that is configured to: associate and store a first certificate and the first secret key in the memory when the first certificate, which is made out based on the first type certificate signing request, is installed in the information processing apparatus; and associate and store a second certificate and the second secret key in the memory when the second certificate, which is made out based on the second type certificate signing request, is installed in the information processing apparatus.

According thereto, the information processing apparatus can use the installed certificate to communicate with another device.

According to still another illustrative aspect of the invention, the preparation unit is configured to: delete the second secret key from the memory, when the first certificate is installed in the information processing apparatus; and delete the first secret key from the memory, when the first certificate is installed in the information processing apparatus.

Incidentally, a control method for the above-described information processing apparatus, a method of preparing a certificate signing request, a computer program for the above-described information processing apparatus and a non-transitory computer-readable medium which stores the computer program are also novel and useful.

<Exemplary Embodiments>

Exemplary embodiments of the invention will now be described with reference to the drawings.

[First Exemplary Embodiment]

(System Configuration)

A first exemplary embodiment will be described with reference to the drawings. As shown in FIG. 1, an information processing system 1 includes a LAN 4, an Internet 6, a multi-function device 10 (a peripheral apparatus of a terminal apparatus 60), a terminal apparatus 60 and certificate authorities 70, 80. The multi-function device 10, the terminal apparatus 60 and the certificate authority 70 are connected to the LAN 4. The multi-function device 10, the terminal apparatus 60 and the certificate authority 70 can communicate with each other via the LAN 4. The LAN 4 and the certificate authority 80 are connected to the Internet 6. The terminal apparatus 60 and the certificate authority 80 can communicate with each other via the LAN 4 and the Internet 6.

(Configuration of Multi-function Device 10)

A configuration of the multi-function device 10 will be described. The multi-function device 10 includes a printing function, a scanner function, a copier function, an IPFAX function, electronic mail transmitting and receiving functions and the like. The multi-function device 10 includes a display unit 12, an operation unit 14, a network interface 16, a scan execution unit 18, a printing execution unit 20 and a control unit 22. The respective units 12 to 22 are connected to a bus line 24. The display unit 12 is a display for displaying a variety of information. The operation unit 14 has a plurality of keys. A user can operate the operation unit 14 to input various instructions to the multi-function device 10. The network interface 16 is connected to the LAN 4. The scan execution unit 18 has a scan mechanism such as CIS, CCD and the like and scans a scan target to generate image data. The printing execution unit 20 has a printing mechanism of an inkjet head manner, a laser manner and the like and performs a printing operation in response to an instruction from the control unit 22. The control unit 22 includes a CPU 30 and a memory 32. The memory 32 includes a ROM 34, a VRAM (volatile memory) 36 and an NVRAM (non-volatile memory) 38. The ROM 34 stores therein a program 35. The CPU 30 executes a process in accordance with the program 35 in the ROM 34. The CPU 30 executes a process in accordance with the program 35 so as to implement the functions of respective units 40, 42, 44, 46 and 48.

(Configuration of Terminal Apparatus 60)

The terminal apparatus 60 is a personal computer and the like, for example. The terminal apparatus 60 is connected to the LAN 4. The terminal apparatus 60 includes a display unit 62, an operation unit 64, a network interface 65 and a control unit 66. The respective units are connected to a bus line 61. The display unit 62 is a display for displaying a variety of information. The operation unit 64 includes a keyboard, a mouse, and the like. The network interface 65 is connected to the LAN 4. The control unit 66 includes a CPU 67 and a memory 68.

(Configuration of Certificate Authorities 70, 80)

The certificate authorities 70, 80 are authorities that make out a certificate in response to a certificate signing request (hereinafter, referred to as 'CSR') made by the multi-function device 10. The CSR is classified into: a first type CSR including a basic area and extensions; and a second type CSR that includes a basic area but does not include extensions. In the basic area, various information of a certificate user such as common name, organization, department, city, province, country and the like (hereinafter, referred to as 'basic area information') are described. In the extensions, a variety of information such as 'extended key usage (ExtendedKey-Usage)=email protection (emailProtection)', 'subject alternative name (SubjectAltName)=IPv4 address (IPv4addresss)' and the like are described. The 'extended key usage', the 'subject alternative name' and the like are item names of the information that is described in the extensions. In addition, the 'email protection', the 'IPv4 address' and the like are item contents. The first CSR is a CSR for making out a certificate of version 3 of an x509 format (hereinafter, referred to as 'CSR of x509v3'), for example. The second type CSR is a CSR for making out a certificate of version 1 of the x509 format (hereinafter, referred to as 'CSR of x509v1'), for example. The certificate authority 70 makes out a certificate including extensions based on the first type CSR including extensions. In addition, the certificate authority 70 can make out a certificate not including extensions based on the second type CSR that does not include extensions. On the other hand, the certificate authority 80 can make out a certificate not including extensions based on the second type CSR, but the certificate authority 80 cannot make out a certificate based on the first type CSR including the extensions. In the followings, the certificate authority 70 and the certificate authority 80 having the above characteristics are sometimes referred to as 'Private certificate authority 70' and 'Public certificate authority 80', respectively. Here, the Private certificate authority means an authority that can make out a certificate, only based on a CSR that the multi-function device 10 prepares in accordance with an application of the multi-function device 10. The Public certificate authority 80 means an enterprise, a public institution and the like that makes out a certificate. In this exemplary embodiment, the IPv4 address is adopted as an IP address. However, the IP address is not limited to the IPv4 address. For example, an IPv6 address may be adopted.

(Process executed by Multi-function Device 10)

In the followings, a process that is executed by the control unit 22 of the multi-function device 10 will be described with reference to FIGS. 2 to 5.

A user can use the operation unit 64 of the terminal apparatus 60 to access the web server installed on the multi-function device 10. When the user performs an operation for displaying a certificate setting screen (not shown), a display control unit 44 (refer to FIG. 1) transmits data, which indicates the certificate setting screen, to the terminal apparatus 60. As a result, the terminal apparatus 60 displays the certificate setting screen on the display unit 62. The certificate setting screen is a screen for making a variety of settings relating to a certificate. The certificate setting screen has a first hyperlink for displaying a CSR preparation screen (refer to FIG. 3) and a second hyperlink screen for displaying an install screen (not shown). The user can use the operation unit 64 to operate the first hyperlink, thereby performing an operation for displaying the CSR preparation screen (refer to FIG. 3). In addition, the user can use the operation unit 64 to operate the second hyperlink, thereby performing an operation for displaying the install screen. The install screen is a screen that enables the user to perform an install operation for installing a certificate acquired from the certificate authority in the multi-function device 10, which will be described later.

(CSR Preparing Process)

Figure 2:
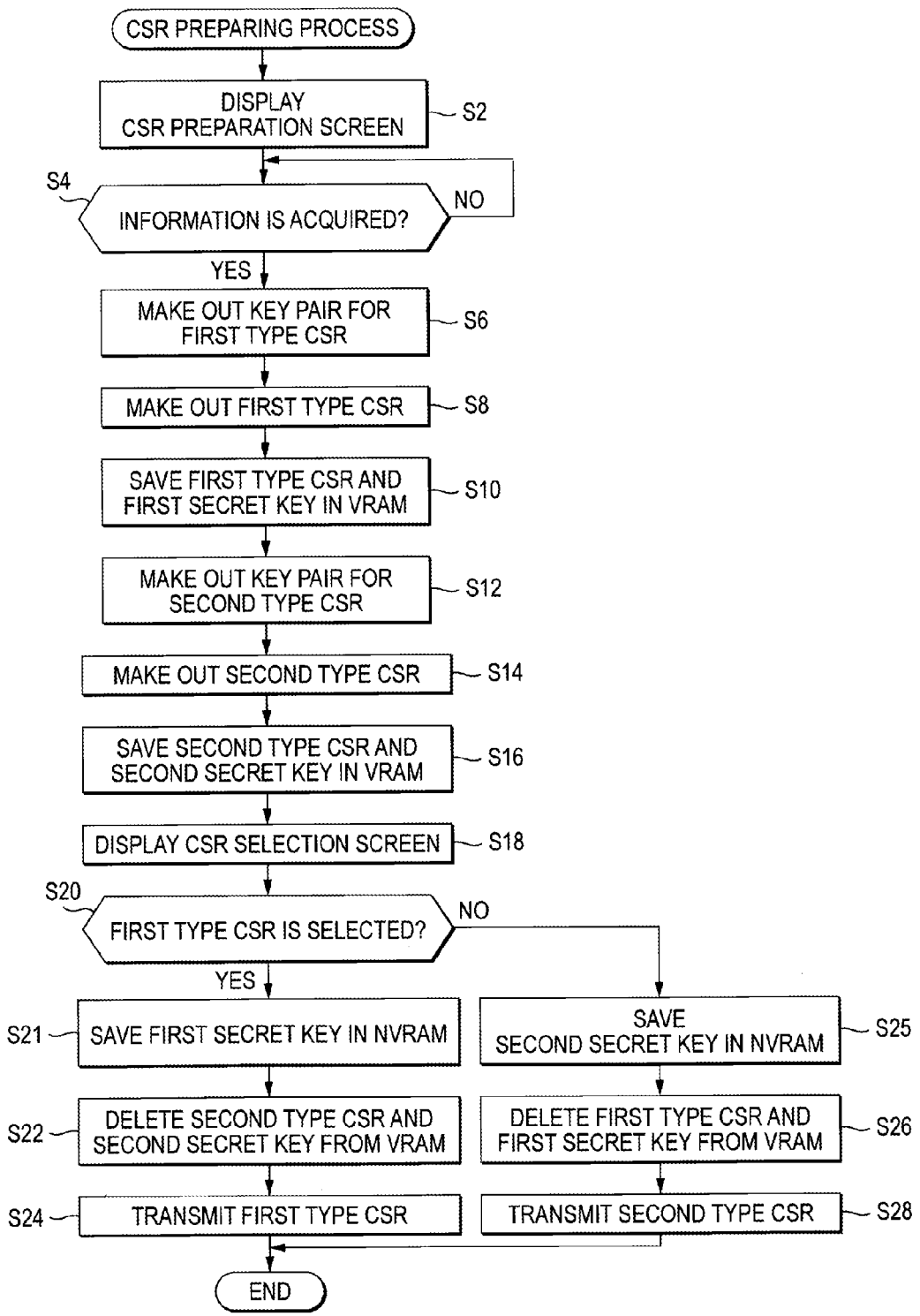
FIG. 2 shows an example of a CSR preparing process.

Referring to FIG. 2, a CSR preparing process will be described. When a user performs an operation for displaying the CSR preparation screen, the display control unit 44 (refer to FIG. 1) transmits data, which indicates a CSR preparation screen 100 (refer to FIG. 3), to the terminal apparatus 60. As a result, the CSR preparation screen 100 is displayed on the display unit 62 of the terminal apparatus 60 (S2 in FIG. 2).

Figure 3:
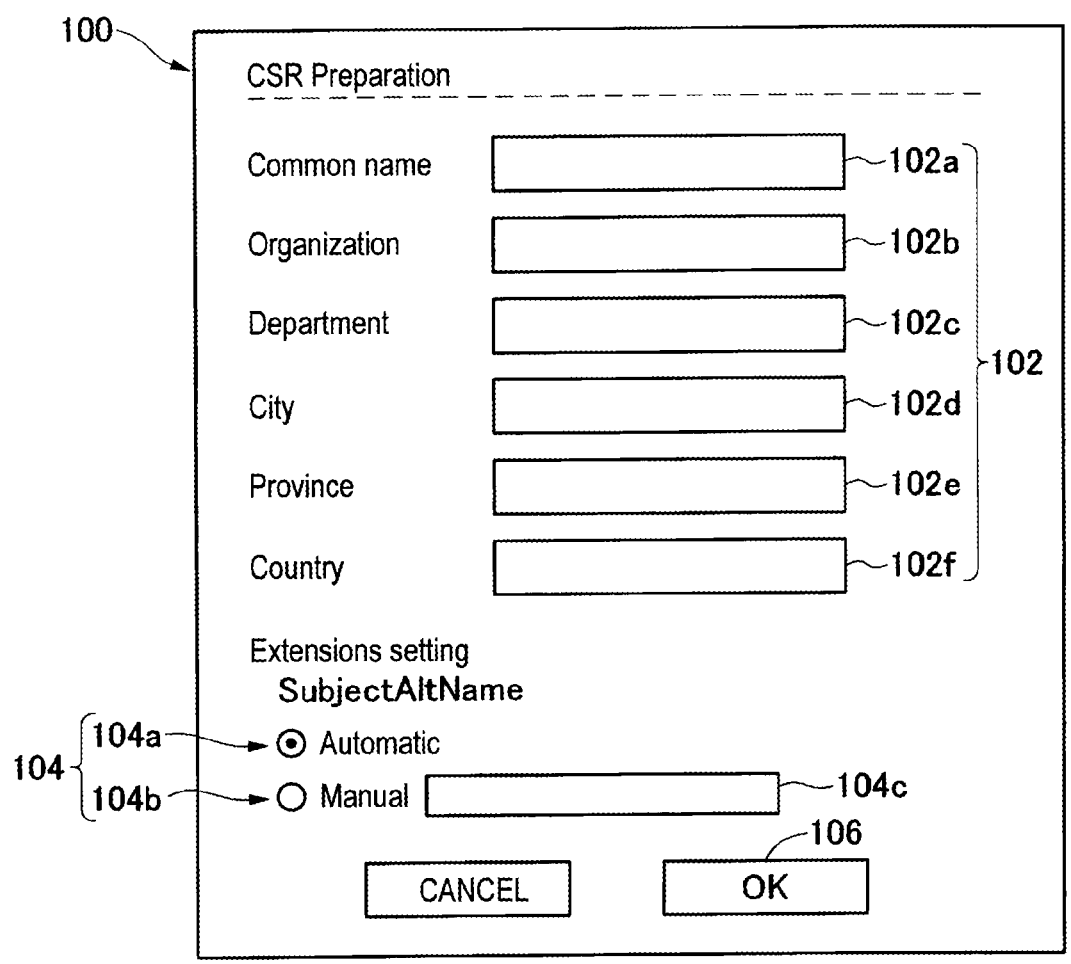
FIG. 3 shows an example of a CSR preparation screen.

As shown in FIG. 3, the CSR preparation screen 100 includes an input unit 102, a selection unit 104 and an OK button 106. The input unit 102 has input columns 102a to 102f of each information of common name, organization, department, city, province and country. The information that should be input in the input columns 102a to 102f is the basic area information. The selection unit 104 has radio buttons 104a, 104b and an input column 104c. The radio button 104a (automatic) is a button for selecting that the IPv4 address of the multi-function device 10 will be used as a subject alternative name (SubjectAltName) that can be included in extensions. The radio button 104b (manual) is a button for selecting that a character string input in the input column 104c will be used as an alias name of a certificate. The user can check any one of the radio buttons 104a, 104b. The user can operate the operation unit 64 to input specific information in the input columns 102a to 102f, to check any one of the radio button 104a, 104b and to operate the OK button 106. When the OK button 106 is operated at a state in which the specific information is input in the input columns 102a to 102f and any one of the radio buttons 104a, 104b is checked, the control unit 66 of the terminal apparatus 60 transmits the basic area information, which is input in the input columns 102a to 102f, the check information, which indicates that any one of the radio buttons 104a, 104b is checked, and the character string, which is input in the input column 104c, to the multi-function device 10.

An acquiring unit 40 (refer to FIG. 1) monitors whether the information transmitted from the terminal apparatus 60 is received (S4). The acquiring unit 40 (refer to FIG. 1) receives and acquires the information from the terminal apparatus 60, wherein the information includes the basic area information, the check information and the character string input in the input column 104c. When the acquiring unit 40 acquires the information (YES in S4), a preparation unit 42 (refer to FIG. 1) makes out a key pair for a first type CSR (S6). Specifically, in S6, the preparation unit 42 makes out a first public key that should be included in a first type CSR and a first secret key that corresponds to the first public key. Then, the preparation unit 42 makes out a first type CSR by using the basic area information, the check information, the character string input in the input column 104c and the first public key (S8). Specifically, in S8, the preparation unit 42 prepares a basic area including the basic area information and the first public key. In addition, the preparation unit 42 acquires information that should be included in extensions from the program 35. Specifically, when the check information indicates that the radio button 104a is checked, the preparation unit 42 acquires, as the 'subject alternative name (SubjectAltName)=IPv4 address (IPv4address) of multi-function device 10' that should be included in extensions, the name of the subject alternative name (SubjectAltName) and the IPv4 address that is set in the multi-function device 10 from the program 35. On the other hand, when the check information indicates that the radio button 104b is checked, the preparation unit 42 further acquires, as the item name of the information that should be included in extensions, the 'subject alternative name (SubjectAltName)' from the program 35 and acquires as the item content, the character string input in the input column 114c. The preparation unit 42 makes out extensions including the acquired information. Although specifically not described in this exemplary embodiment, the information that should be included in the extensions is not limited to the subject alternative name (SubjectAltName). For example, the information that should be included in the extensions may include the extended key usage (ExtendedKeyUsage) and the like. Further, the information that should be included in the extensions may include the other information, instead of including the subject alternative name (SubjectAltName). The selection unit 104 of the extensions setting of the CSR preparation screen 100 may be provided with the other check column or input column in addition to the respective columns 104a to 104c or instead of the respective columns 104a to 104c. The information that should be included in the extensions may any one of a preset value that is acquired from the program 35 and a value that is set by a user. In other words, the information that should be included in the extensions is generated by the information that is input from the CSR preparation screen 100 by the CSR preparing process and the information that is acquired from the program 35. The preparation unit 42 makes out a first type CSR by combining the prepared basic area information and extensions. When the preparation unit 42 makes out the first type CSR, the preparation unit 42 saves the first type CSR and the first secret key in the VRAM 36 (S10).

Then, the preparation unit 42 makes out a key pair for a second type CSR (S12). Specifically, the preparation unit 42 makes out a second public key and a second secret key. Then, the preparation unit 42 makes out a second type CSR by using the basic area information and the second public key (S14). Specifically, in S14, the preparation unit 42 makes out a basic area including the basic area information and the second public key, thereby preparing a second type CSR. As described above, the second type CSR does not include extensions. When the preparation unit 42 makes out the second type CSR, the preparation unit 42 stores the second type CSR and the second secret key in the VRAM 36 (S16). Accordingly, at this time, as shown in FIG. 5(a), the VRAM 36 stores information, in which the first type CSR and the first secret key are associated with each other, and information, in which the second type CSR and the second secret key are associated with each other. Then, the display control unit 44 transmits data, which indicates a CSR selection screen 110 (refer to FIG. 4), to the terminal apparatus 60. As a result, the CSR selection screen 110 is displayed on the display unit 62 of the terminal apparatus 60 (S18 in FIG. 2).

Figure 4:
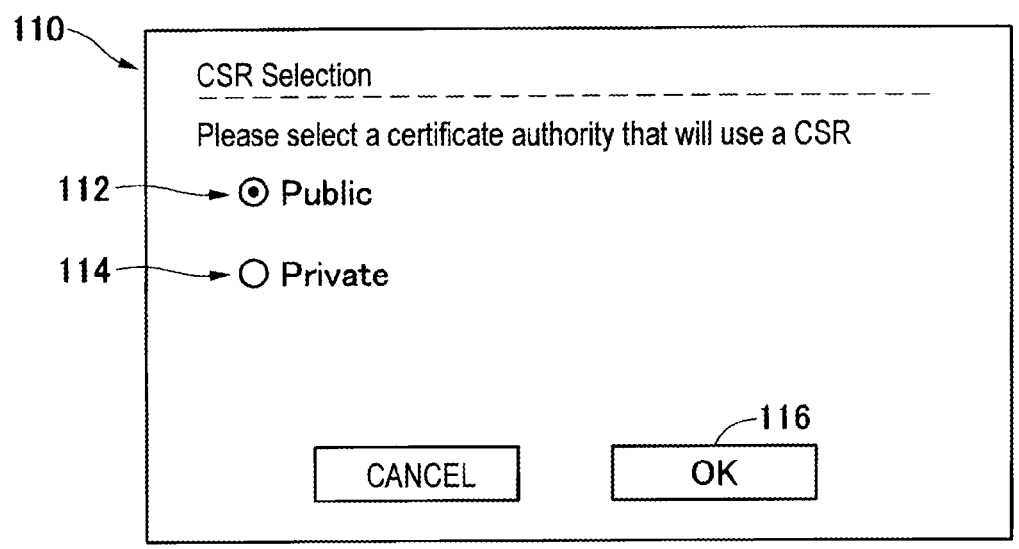
FIG. 4 shows an example of a CSR selection screen.

As shown in FIG. 4, the CSR selection screen 110 includes: a message to prompt the user to select a certificate authority; a radio button 112 for selecting the Public certificate authority 80 (refer to FIG. 1); a radio button 114 for selecting the Private certificate authority 70 (refer to FIG. 1); and an OK button 116. The user can use the operation unit 64 to check one of the radio buttons 112, 114 and to operate the OK button 116. When the user checks the radio button 112, it means that the user selects, as a certificate authority for preparing a certificate by using a CSR, the Public certificate authority 80. In other words, it means that the user selects the preparation of the second type CSR. On the other hand, when the user checks the radio button 114, it means that the user selects, as a certificate authority for preparing a certificate by using a CSR, the Private certificate authority 70. As described above, the Private certificate authority 70 can make out a certificate based on both the first type CSR and the second type CSR. However, in this exemplary embodiment, when the user checks the radio button 114, it means that the user selects the first type CSR. In this exemplary embodiment, the user can select any one of the Public certificate authority 80 and the Private certificate authority 70 in accordance with the CSR selection screen 110, thereby selecting any one of the first type CSR and the second type CSR. When the user operates the OK button 116, the control unit 66 of the terminal apparatus 60 transmits the selection result of the user to the multi-function device 10.

As described above, in this exemplary embodiment, the user can select any one of the first type CSR and the second type CSR based on the certificate authority that should prepare a certificate. Thus, the user can easily image the options. Even when the user does not have sufficient knowledge about a difference between the first and second type CSRs, the user can appropriately select one of the first and second type CSRs.

The preparation unit 42 determines whether the user selects the first type CSR (S20). Specifically, when the selection result from the terminal apparatus 60 indicates the Private certificate authority 70, the preparation unit 42 determines YES in S20. On the other hand, when the selection result from the terminal apparatus 60 indicates the Public certificate authority 80, the preparation unit 42 determines NO in S20. When a result of the determination in S20 is YES, the preparation unit 42 stores the first secret key, which is stored in the VRAM 36, in the NVRAM 38. Further, the preparation unit 42 deletes the first secret key from the VRAM 36 (S21). Then, the preparation unit 42 deletes the second type CSR and the second secret key from the VRAM 36 (S22). According to this configuration, the multi-function device 10 can rapidly delete the second type CSR and the second secret key from the VRAM 34. At the completion time of S22, as shown in FIG. 5(b), the VRAM 36 stores the first type CSR. In addition, the NVRAM 38 stores the first secret key. Then, an output unit 46 (refer to FIG. 1) transmits the first type CSR in the VRAM 36 to the terminal apparatus 60. As a result, the first type CSR is displayed on the display unit 62 (S24). The user can confirm the content of the first type CSR. When the user uses the operation unit 64 to perform a predetermined operation, the control unit 66 saves the first type CSR, which is displayed on the display unit 62, in the memory 68 of the terminal apparatus 60.

When a result of the determination in S20 is NO, the preparation unit 42 stores the second secret key, which is stored in the VRAM 36, in the NVRAM 38. Further, the preparation unit 42 deletes the second secret key from the VRAM 36 (S25). Then, the preparation unit 42 deletes the first type CSR and the first secret key from the VRAM 36 (S26). According to this configuration, the multi-function device 10 can rapidly delete the first type CSR and the first secret key from the VRAM 36. Then, the output unit 46 transmits the second type CSR in the VRAM 36 to the terminal apparatus 60. As a result, the second type CSR is displayed on the display unit 62 (S28). The user can confirm the content of the second type CSR. When the user uses the operation unit 64 to perform a predetermined operation, the control unit 66 saves the second type CSR, which is displayed on the display unit 62, in the memory 68 of the terminal apparatus 60.

In this exemplary embodiment, before the user selects one of the first type CSR and the second type CSR, the first type CSR and the second type CSR have been already prepared. Accordingly, when the user performs the selection, the multi-function device 10 can immediately transmit the first or second type CSR. Thus, compared to a configuration in which after a user selects one of the first type CSR and the second type CSR, the corresponding one CSR is prepared and output, it is possible to shorten a time period from the user selection to the transmission of the CSR.

(Process After CSR Preparing Process is Completed)

Figure 5:
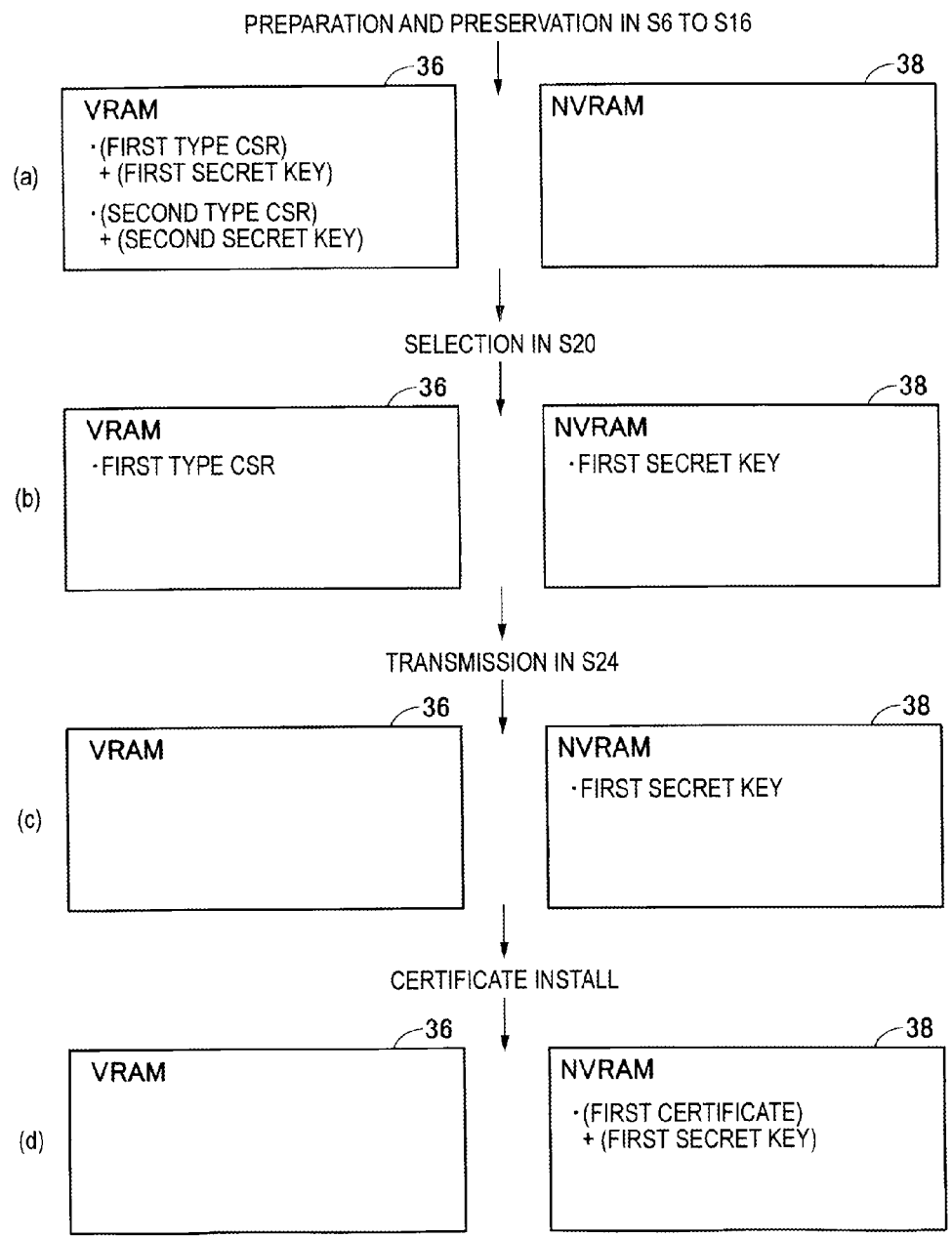
FIG. 5 shows an example of memory contents of a VRAM and an NVRAM.

The process of the multi-function device 10 after the CSR preparing process is completed will be described. When the CSR preparing process (refer to FIG. 2) is completed, as shown in FIG. 5(*c*), a memory control unit 48 (refer to FIG. 1) deletes the first or second CSR, which has been transmitted to the terminal apparatus 60 in S24 or S28, from the VRAM 36.

The user can use the operation unit 64 of the terminal apparatus 60 to perform an operation for designating a certificate authority. In this case, the terminal apparatus 60 transmits the CSR acquired from the multi-function device 10 (CSR that is saved in the memory 68) to a certificate authority that is designated by the user.

For example, when the Private certificate authority 70 receives the first type CSR from the terminal apparatus 60, the Private certificate authority 70 makes out a first certificate including extensions based on the first type CSR and transmits the first certificate to the terminal apparatus 60. In addition, for example, when the Public certificate authority 80 receives the second type CSR from the terminal apparatus 60, the Public certificate authority 80 makes out a second certificate not including extensions based on the second type CSR and transmits the second certificate to the terminal apparatus 60. Incidentally, if the user selects the Public certificate authority 80 even though the first type CSR is acquired, the Public certificate authority 80 cannot make out a certificate based on the first type CSR. In this case, the terminal apparatus 60 cannot obtain a certificate.

When the terminal apparatus 60 receives the first certificate from the Private certificate authority 70, the terminal apparatus 60 stores the first certificate in the memory 68. Then, as described above, the user can use the operation unit 64 of the terminal apparatus 60 to execute an operation for displaying the install screen (not shown). When an operation for displaying the install screen is executed, the display control unit 44 transmits data, which indicates the install screen, to the terminal apparatus 60. As a result the install screen is displayed on the display unit 62 of the terminal apparatus 60. The user can use the operation unit 64 of the terminal apparatus 60 to execute an install operation for installing the first certificate stored in the memory 68 into the NVRAM 38 of the multi-function device 10, in the install screen. In this case, the control unit 66 of the terminal apparatus 60 transmits the first certificate to the multi-function device 10. As a result, as shown in FIG. 5(*d*), the memory control unit 48 of the multi-function device 10 associates and stores (installs) the first certificate and the first secret key in the NVRAM 38. Like the first certificate, when the terminal apparatus 60 receives the second certificate from the Public certificate authority 80, the terminal apparatus 60 transmits the second certificate to the multi-function device 10. As a result, the memory control unit 48 of the multi-function device 10 associates and stores (installs) the second certificate and the second secret key in the NVRAM 38.

When the certificate and the secret key are installed in the NVRAM 36, the multi-function device 10 can use the installed certificate to communicate with another device (not shown).

The information processing system 2 of this exemplary embodiment has been described. In this exemplary embodiment, the CSR selection screen 110 shown in FIG. 4 enables the user to select one of the first and second type CSRs. When the user selects the first type CSR (YES in S20 of FIG. 2), the output unit 46 transmits the first type CSR to the terminal apparatus 60 (S30). On the other hand, when the user selects the second type CSR (NO in S20), the output unit 46 transmits the second type CSR to the terminal apparatus 60 (S30). Accordingly, the user executes the operation of selecting one of the first type CSR and the second type CSR in accordance with the CSR selection screen 110, thereby easily acquiring the CSR.

The correspondence between the configuration of this exemplary embodiment and the configuration of the invention will be described. The multi-function device 10 is one example of the 'information processing apparatus.' The CSR selection screen 110 of FIG. 4 is one example of the 'selection screen.' The display unit 62 of the terminal apparatus 60 is one example of the 'display unit.' The result YES in S20 of FIG. 2 and the result NO in S20 are examples of the 'first case' and the 'second case', respectively. The Private certificate authority 70 and the Public certificate authority 80 are examples of the 'first type certificate authority' and the 'second type certificate authority', respectively. The basic area information that is acquired in S4 of FIG. 2, the information that should be included in the extensions and is acquired from the program 35 in S8 of FIG. 2 and the character string that is input in the input column 104*c* (refer to FIG. 3) and is acquired in S4 of FIG. 2 are examples of the 'specific information.'

[Second Exemplary Embodiment]

A second exemplary embodiment of the present invention will be described. Incidentally, a detailed description common to the first exemplary embodiment will be omitted.

(CSR Preparing Process)

Figure 6:
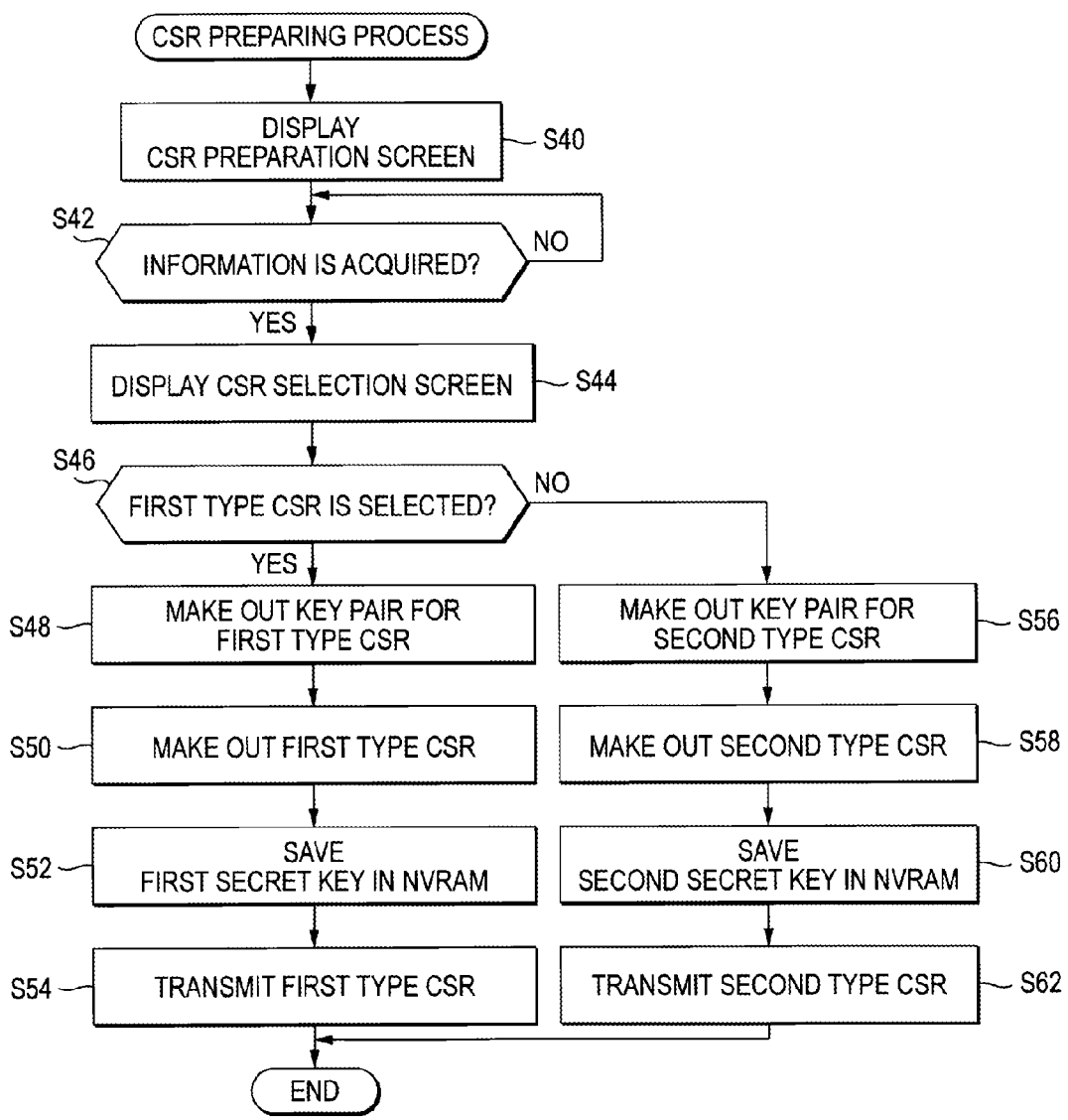
FIG. 6 shows a flow chart of a CSR preparing process according to a second exemplary embodiment.
Figure 7:
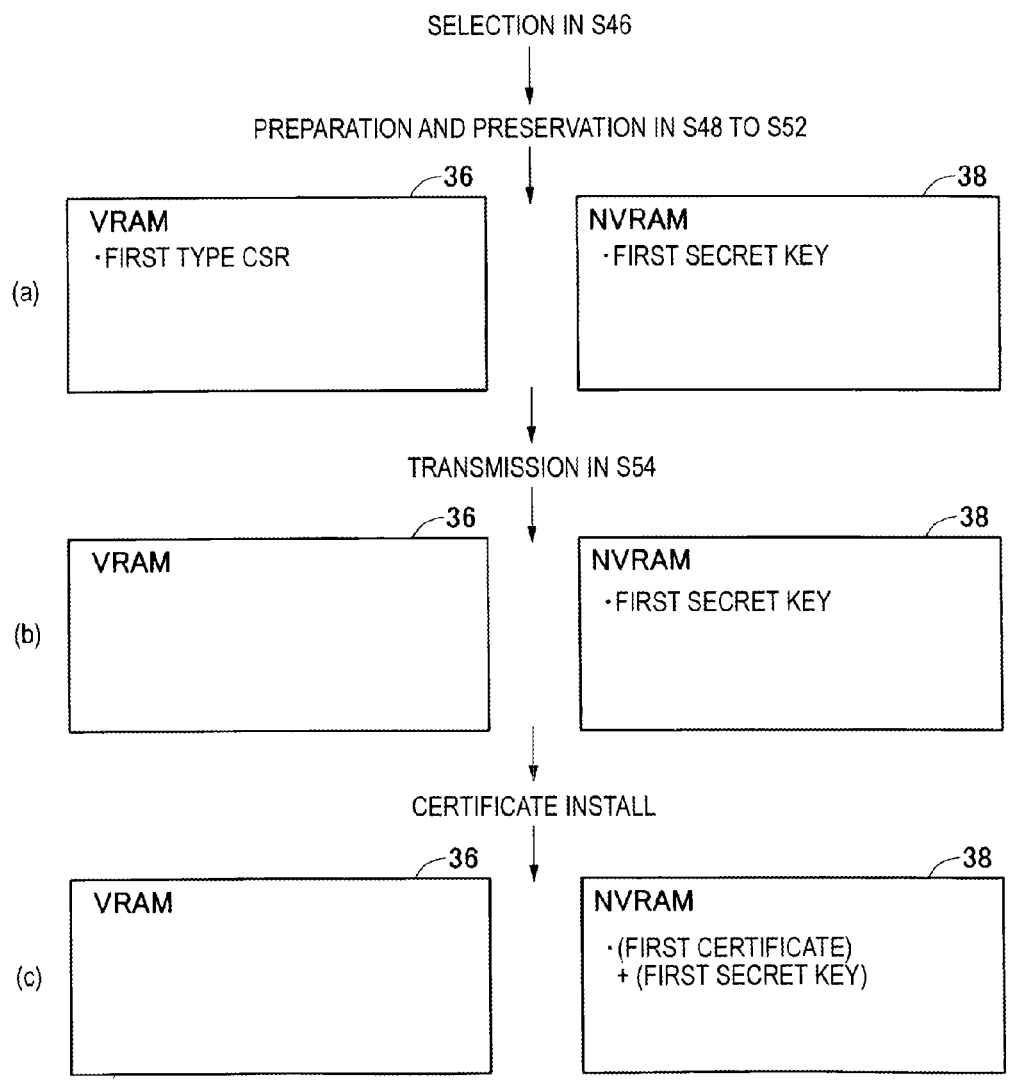
FIG. 7 shows an example of memory contents of a VRAM and an NVRAM.

The differences between the second exemplary embodiment and the first exemplary embodiment are described with reference to FIGS. 6 and 7. S40 and S42 of FIG. 6 are the same as S2 and S4 of FIGS. 2. S44 and S46 of FIG. 6 are the same as S18 and S20 of FIG. 2. When the first type CSR is selected (YES in S46), the preparation unit 42 makes out a key pair for the first type CSR (S48). Then, the preparation unit 42 makes out the first type CSR (S50). The first type CSR and the first secret key are prepared in the VRAM 36. Then, the preparation unit 42 stores the first secret key, which is stored in the, VRAM 36, in the NVRAM 38 (S52). In S52, the preparation unit 42 further deletes the first secret key from the VRAM 36. At the completion time of S52, as shown in FIG. 7(*a*), the VRAM 36 stores the first type CSR. In addition, the NVRAM 38 stores the first secret key. Then, the output unit 46 transmits the first type CSR to the terminal apparatus 60. As a result, the first type CSR is displayed on the display unit 62 (S54).

Like the case where the first type CSR is selected, when the second type CSR is selected (NO in S46), the preparation unit 42 makes out a key pair for the second type CSR (S56) and makes out the second type CSR (S58). Then, the preparation unit 42 stores the second secret key in the NVRAM 38 (S60). Then, the output unit 46 transmits the second type CSR to the terminal apparatus 60. As a result, the second type CSR is displayed on the display unit 62 (S62).

(Process After CSR Preparing Process is Completed)

The process of the multi-function device 10 after the CSR preparing process is completed is the substantially same as the first exemplary embodiment. Accordingly, when the first type CSR is transmitted in S54 of FIG. 6, the memory control unit 48 deletes the first type CSR from the VRAM 36 as shown in FIG. 7(b). Like the first exemplary embodiment, the user can make a request for certificate preparation to acquire the first certificate, which is prepared on the basis of the first type CSR, or the second certificate, which is prepared on the basis of the second type CSR, so as to install the first certificate or the second certificate in the multi-function device 10. As shown in FIG. 7(c), for example, when the install operation of the first certificate is executed, the memory control unit 48 of the multi-function device 10 associates and stores the first certificate and the first secret key in the NVRAM 38.

In the second exemplary embodiment, the multi-function device 10 makes out only one type CSR that is selected by the user. The multi-function device 10 does not have to prepare a CSR that is not selected by the user. Thus, it is possible to reduce the resource processing burden of the multi-function device 10 (for example, burden of the preparation processing and the burden of the memory). In the second exemplary embodiment, the result YES in S46 of FIG. 6 and the result NO in S46 are examples of the 'first case' and the 'second case', respectively.

[Third Exemplary Embodiment]

A third exemplary embodiment of the present invention will be described.

Incidentally, a detailed description common to the first exemplary embodiment will be omitted.

(CSR Preparing Process)

The differences between a third exemplary embodiment and the first exemplary embodiment are described with reference to FIGS. 8 to 10. In the third exemplary embodiment, when an operation of starting the CSR preparing process is executed, the control unit 22 executes processes of S70 to S84 of FIG. 8. The processes of S70 to S84 are the substantially same as S2 to S16 of FIG. 2. However, in S78 of the third exemplary embodiment, the preparation unit 42 saves the first type CSR and the first secret key in the NVRAM 38, differently from S10 of FIG. 2. Likewise, in S84 of the third exemplary embodiment, the preparation unit 42 saves the second type CSR and the second secret key in the NVRAM 38, differently from S16 of FIG. 2. Accordingly, at the completion time of S84, as shown in FIG. 10(a), the NVRAM 38 stores the information in which the first type CSR and the first secret key are associated with each other and the information in which the second type CSR and the second secret key are associated with each other.

The processes of S86 and S88 are the same as S18 and S20 of FIG. 2. In addition, the processes of S90 and S92 are the same as S24 and S26 of FIG. 2. In the third exemplary embodiment, even when the CSR preparing process is ended, both the CSR, which is selected by the user, and the CSR, which is not selected by the user, are continuously saved in the NVRAM 38 (refer to FIG. 10(a)).

(CSR Deleting Process)

A process after the CSR preparing process will be described. Like the first exemplary embodiment, the user makes a request for certificate preparation to acquire the first certificate, which is prepared on the basis of the first type CSR, or the second certificate, which is prepared on the basis of the second type CSR, so as to install the first certificate or the second certificate in the multi-function device 10. For example, when the first certificate is installed in the multi-function device 10, as shown in FIG. 10(b), the NVRAM 38 stores the first certificate, the first type CSR, the first secret key, the second type CSR and the second secret key.

Figure 9:
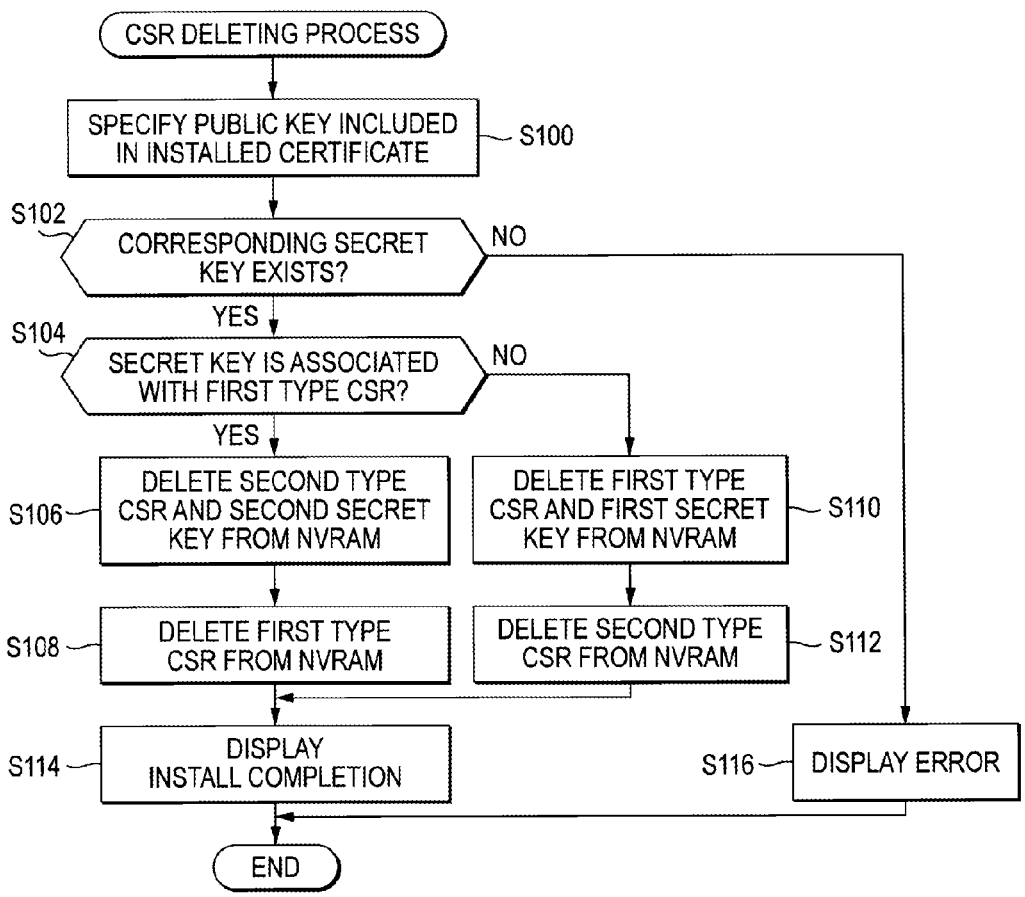
FIG. 9 shows a flow chart of a CSR deleting process.
Figure 10:
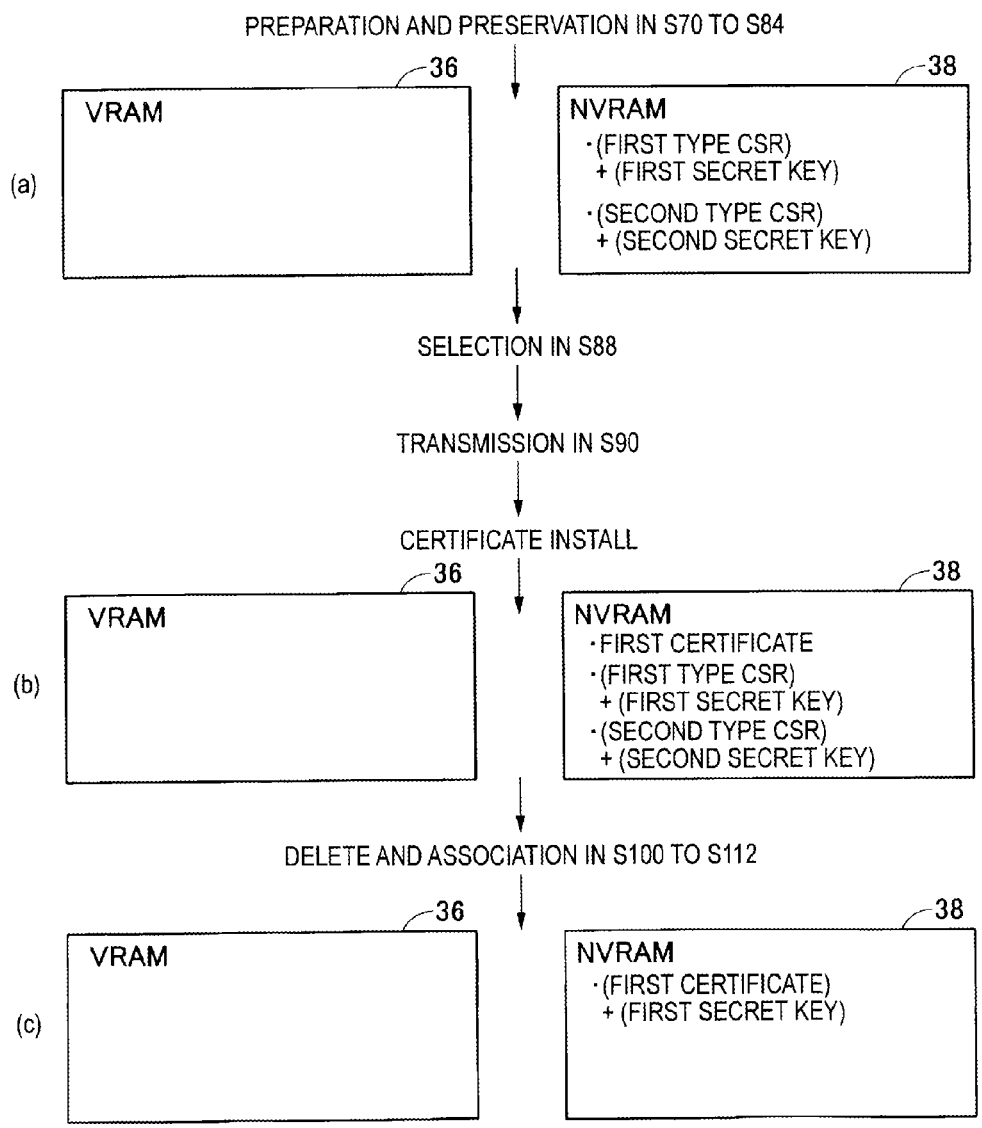
FIG. 10 shows an example of memory contents of a VRAM and an NVRAM.

When the certificate is installed in the NVRAM 38, a CSR deleting process of FIG. 9 starts. The memory control unit 48 (refer to FIG. 1) specifies a public key that is included in the installed certificate (S100). Then, the memory control unit 48 determines whether the secret key corresponding to the public key specified in S100 (hereinafter, referred to as 'specific secret key') is in the NVRAM 38 (S102). When the specific secret key is in the NVRAM 38 (YES in S102), the memory control unit 48 determines whether the specific secret key is associated with the first type CSR (S104). For example, when the specific secret key is the first secret key, the memory control unit determines YES in S104. When the specific secret key is the second secret key, the memory control unit determines NO in S104.

When the specific secret key is the first secret key (YES in S104), the preparation unit 42 deletes the second type CSR and the second secret key from the NVRAM 38 (S106). Then, the preparation wait 42 deletes the first type CSR from the NVRAM 38 (S108). When the step of S108 is completed, the memory control unit 48 associates and stores the installed certificate (i.e., first certificate) and the first secret key in the NVRAM 38. Accordingly, at the completion time of S108, the NVRAM 38 stores therein the first certificate and the first secret key with being associated with each other as shown in FIG. 10(c).

On the other hand, when the specific secret key is the second secret key (NO in S104), the preparation unit 42 deletes the first type CSR and the first secret key from the NVRAM 38 (S110). Then, the preparation unit 42 deletes the second type CSR from the NVRAM 38 (S112). When the step of S112 is completed, the memory control unit 48 associates and stores the installed certificate (i.e., second certificate) and the second secret key in the NVRAM 38.

When the step of S108 or S112 is completed, the display control unit 44 transmits data, which indicates a screen showing that the install of the certificate has been completed, to the terminal apparatus 60 (S114). Thereby, the user can know that the install of the certificate has been completed. When the step of S114 is completed, the CSR deleting process is ended. On the other hand, when the specific secret key is not in the NVRAM 38 (NO in S102), the display control unit 44 transmits data, which indicates a screen showing an error, to the terminal apparatus 60 (S116). When the step of S116 is completed, the CSR deleting process is ended.

Figure 8:
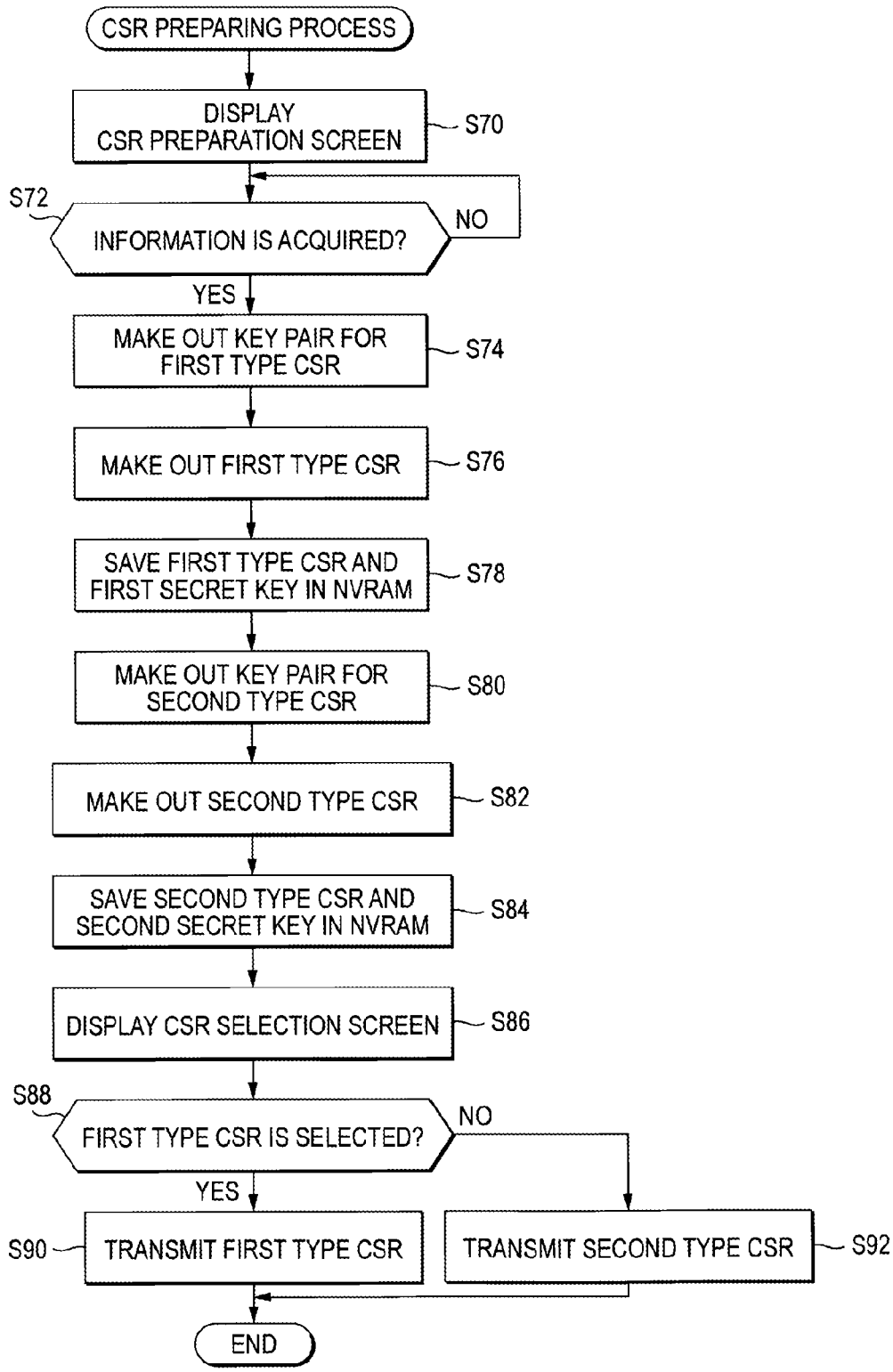
FIG. 8 shows a flow chart of a CSR preparing process and a CSR acquiring process of a third exemplary embodiment.

As described above, in the third exemplary embodiment, as shown in S78 and S84 of FIG. 8, in the CSR preparing process, the preparation unit 42 stores the information in which the first type CSR and the first secret key are associated with each other and the information in which the second type CSR and the second secret key are associated with each other in the NVRAM 38. The multi-function device 10 does not delete the first and second type CSRs until the first or second certificate is installed in the multi-function device 10. For example, there is a possibility that the user will acquire the first type CSR from the multi-function device 10 and erroneously transmit the first type CSR to the Public certificate authority 80. As described above, the Public certificate authority 80 cannot make out a certificate based on the first type CSR. The user who knows that a certificate is not prepared based on the first type CSR may consider transmitting the second type CSR to the Public certificate authority 80. In the third exemplary embodiment, the certificate setting screen further includes a third hyperlink for displaying the CSR selection screen (refer to FIG. 4). Accordingly, in the above situation, the user can use the operation unit 64 of the terminal apparatus 60 to operate the third hyperlink in the certificate setting screen, thereby executing the operation for displaying the CSR selection screen (refer to FIG. 4). When the operation for displaying the CSR selection screen is executed, the control unit 66 of the terminal apparatus 60 transmits a predetermined command to the multi-function device 10. In this case, the control unit 22 of the multi-function device 10 performs the same processes as S86 to S92 of FIG. 8. In other words, the display control unit 44 transmits the data, which indicates the CSR selection screen 110 (refer to FIG. 4), to the terminal apparatus 60. As a result, the CSR selection screen 110 (refer to FIG. 4) is displayed on the display unit 62 of the terminal apparatus 60 (S86 in FIG. 8). The user can select the second type CSR (i.e., 'Public') in accordance with the CSR selection screen 110 (refer to FIG. 4), so that the user can acquire the second type CSR. In other words, the user can acquire the second type CSR from the multi-function device 10 without requiring the multi-function device 10 to prepare the second type CSR again. Incidentally, in the third exemplary embodiment, the result YES in S88 of FIG. 8 and the result NO in S88 are examples of the ' first case' and the 'second case', respectively.

<Modifications to Exemplary Embodiments>

Modifications to the above-described exemplary embodiments will be described.

(1) A CSR of x509v3 including extensions may be the first type CSR, and a CSR of x509v3 including no information in extensions may be the second type CSR.

(2) The output of the first type or second type CSR may be performed by an arbitrary method without being limited to the download to the memory of the terminal apparatus 60. For example, the displayed CSR information may be designated by the user, and a content thereof may be copied and pasted to a text file so as to be saved.

(3) The certificate authority 70 may be configured such that the certificate authority 70 is unable to prepare a certificate based on the second type CSR. In other words, generally, the 'first type certificate authority' may be a certificate authority that can make out a certificate at least based on the first type CSR. In addition, the 'second type certificate authority' may be a certificate authority that cannot make out a certificate based on the first type CSR and can prepare a certificate based on the second type CSR.

(4) The respective information may be displayed on the display unit 12 of the multi-function device 10. In this modified embodiment, the display unit 12 of the multi-function device 10 is an example of the 'display unit.'

(5) In the above-described exemplary embodiments, the multi-function device 10 has been exemplified. Alternative to the multi-function device 10, a PC, a server a printer, a scanner, a mobile terminal (PDA, mobile phone and the like) may be used. Each of the devices is included in the configuration of the 'information processing system.'

The specific exemplary embodiments of the invention have been described. However, the embodiments are exemplary and not to limit the scope of the invention. The technologies defined in the claims include the modified and changed examples to the exemplary embodiments.

In addition, the technical elements described and shown in the specification and the drawings provide the technical usefulness independently or in combination and are not limited to a combination of the claims at the time of filing this application. Further, the technologies exemplified in the specification or drawings achieve the purposes at the same time and have a technical usefulness inasmuch as one purpose is realized.

What is claimed is:

1. An information processing apparatus comprising:
a processor configured to:
acquire specific information;
generate, in a memory, a first type certificate signing request including extensions based on the specific information;
generate, in the memory, a second type certificate signing request not including extensions based on the specific information;
display a selection screen on a display;
output one of the first type certificate signing request and the second type certificate signing request to a terminal apparatus according to selection in the selection screen;
delete the second type certificate signing request from the memory in response to selection of the first type certificate signing request in the selection screen when both the first type certificate signing request and the second type certificate signing request are stored in the memory; and
delete the first type certificate signing request from the memory in response to selection of the second type certificate signing request in the selection screen when both the first type certificate signing request and the second type certificate signing request are stored in the memory.

2. The information processing apparatus according to claim 1,
wherein the selection screen is a screen configured to allow a user to select one of a first type certificate authority and a second type certificate authority that is different from the first type certificate authority, and
wherein the processor is further configured to:
output the first type certificate signing request in response to selection of the first type certificate authority in the selection screen; and
output the second type certificate signing request in response to selection of the second type certificate authority in the selection screen.

3. The information processing apparatus according to claim 1,
wherein the processor is further configured to displays the selection screen on the display after both the first type certificate signing request and the second type certificate signing request are generated.

4. The information processing apparatus according to claim 1,
wherein the processor is further configured to:
generate the first type certificate signing request without generating the second type certificate signing request in response to selection of the first type certificate signing request in the selection screen; and
generate the second type certificate signing request without generating the first type certificate signing request in response to selection of the second type certificate signing request in the selection screen.

5. The information processing apparatus according to claim 1,
wherein the processor is further configured to:
in response to selection of the first type certificate signing request, generate a first secret key, a first public key and the first type certificate signing request including the first public key; and
in response to selection of the second type certificate signing request, generate a second secret key, a second public key and the second type certificate signing request including the second public key.

6. The information processing apparatus according to claim 5,
wherein the processor is further configured to:
store a first certificate in association with the first secret key in the memory in response to installation of the first certificate in the information processing apparatus, the first certificate being generated based on the first type certificate signing request; and
store a second certificate in association with the second secret key in the memory in response to installation of the second certificate in the information processing apparatus, the second certificate being generated based on the second type certificate signing request.

7. The information processing apparatus according to claim 6,
wherein the processor is further configured to:
delete the second secret key from the memory in response to installation of the first certificate in the information processing apparatus; and
delete the first secret key from the memory in response to installation of the first certificate in the information processing apparatus.

8. The information processing apparatus according to claim 1,
wherein the specific information comprises common name, organization, department, city, province and country, and
wherein the extensions comprise a subject alternative name and an IP address obtained from one of the information processing apparatus and a user.

9. An information processing apparatus comprising:
a processor configured to:
acquire specific information;
generate, in a memory, a first type certificate signing request including extensions based on the specific information;
generate, in the memory, a second type certificate signing request not including extensions based on the specific information;
display a selection screen on a display;
output one of the first type certificate signing request and the second type certificate signing request to a terminal apparatus according to selection by a user in the selection screen; and
delete the first type certificate signing request and second type certificate signing requests from the memory in response to installation of a first certificate or a second certificate in the information processing apparatus when both the first type certificate signing request and the second type certificate signing request are stored in the memory, the first certificate being generated based on the first type certificate signing request, the second certificate being generated based on the second type certificate signing request.

10. A non-transitory computer-readable medium having a computer program stored therein and is readable by a computer provided in an information processing apparatus, said computer program, when executed by the computer, causes the computer to:
acquire specific information;
generate, in a memory, a first certificate signing request based on the specific information including extensions;
generate, in the memory, a second type certificate signing request not including extensions based on the specific information;
display a selection screen on a display;
output one of the first type certificate signing request and the second type certificate signing request to a terminal apparatus according to selection by a user in the selection screen;
delete the second type certificate signing request from the memory in response to selection of the first type certificate signing request in the selection screen when both the first type certificate signing request and the second type certificate signing request are stored in the memory; and
delete the first type certificate signing request from the memory in response to selection of the second type certificate signing request in the selection screen when both the first type certificate signing request and the second type certificate signing request are stored in the memory.

11. A method, comprising:
acquiring specific information;
generating a first type certificate signing request including extensions based on the specific information;
generating a second type certificate signing request not including extensions based on the specific information;
displaying a selection screen;
outputting one of the first type certificate signing request and the second type certificate signing request to a terminal apparatus according to selection by a user in the selection screen;
deleting the second type certificate signing request from the memory in response to selection of the first type certificate signing request in the selection screen when both the first type certificate signing request and the second type certificate signing request are stored in the memory; and
deleting the first type certificate request from the memory in response to selection of the second type certificate signing request in the selection screen when both the first type certificate signing request and the second type certificate signing request are stored in the memory.

12. The method according to claim 11,
wherein the selection screen is a screen configured to allow the user to select one of a first type certificate authority and a second type certificate authority that is different from the first type certificate authority, and
wherein the outputting one of the first type certificate signing request and the second type certificate signing request comprises:
outputting the first type certificate request in response to selection of the first type certificate authority in the selection screen, and
outputting the second type certificate signing request in response to selection of the second type certificate authority in the selection screen.

* * * * *